United States Patent
Muthukumar et al.

(12) 
(10) Patent No.: US 6,615,403 B1
(45) Date of Patent: Sep. 2, 2003

(54) COMPARE SPECULATION IN SOFTWARE-PIPELINED LOOPS

(75) Inventors: Kalyan Muthukumar, Cupertino, CA (US); David A Helder, Holland, MI (US)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 09/608,504

(22) Filed: Jun. 30, 2000

(51) Int. Cl.[7] ................................................ G06F 9/45
(52) U.S. Cl. ..................... 717/160; 717/153; 717/154; 717/156; 717/159; 717/161
(58) Field of Search ................................ 717/131, 132, 717/151, 153, 152, 154, 155, 156, 159, 160, 161

(56) References Cited

U.S. PATENT DOCUMENTS 5,450,585 A * 9/1995 Johnson ...................... 717/156
5,491,823 A * 2/1996 Ruttenberg ................. 717/161
6,202,204 B1 * 3/2001 Wu et al. .................... 717/151

OTHER PUBLICATIONS

Lam, Monica, "Software Pipelining: An Effective Scheduling Technique for VLIW Machines," Jun. 1988, ACM Press, ACM SIGPLAN '88.*

Rogers, Anne et al., "Software Support for Speculative Loads," Oct. 1992, ACM Press, ASPLOS V, p. 42.*

Allan, Vicki H. et al., "Software Pipelining," Sep. 1995, ACM Press, ACM Computing Surveys vol. 27, No. 3, pp. 383–384.*

* cited by examiner

*Primary Examiner*—Gregory Morse
*Assistant Examiner*—David A. Snyder
(74) *Attorney, Agent, or Firm*—Shireen I. Bacon (57) ABSTRACT

The present invention provides a mechanism for implementing compare speculation in software pipelined loops. A data dependency graph (DDG) is generated for a loop that includes a control compare instruction, a compare instruction and a non-speculative instruction that depends directly or indirectly on the compare instruction. A loop-carried edge between the control compare instruction and the compare instruction is replaced by a loop-carried edge between the control compare instruction and the non-speculative instruction. If the compare instruction is speculated when the loop is modulo-scheduled, any load instruction that depends on the compare is converted to a speculative load, and a loop-carried edge is added between the control compare and a check instruction associated with the speculative load. A loop-independent edge is also added between the check instruction and the non-speculative instruction if the non-speculative instruction also depends on the load.

21 Claims, 10 Drawing Sheets

COMPARE SPECULATION IN SOFTWARE-PIPELINED LOOPS

BACKGROUND OF THE INVENTION

1. Technical Field

The present invention relates to mechanisms for optimizing computer code, and in particular, to mechanisms for improving the performance of software-pipelined loops.

2. Background Art

Software pipelining is a method for scheduling non-dependent instructions from different logical iterations of a program loop to execute concurrently. Overlapping instructions from different logical iterations of the loop increases the amount of instruction level parallelism (ILP) in the program code. Code having high levels of ILP uses the execution resources available on modern, superscalar processors more effectively.

A loop is software-pipelined by organizing the instructions of the loop body into stages of one or more instructions each. These stages form a software-pipeline having a pipeline depth equal to the number of stages (the "stage count" or "SC") of the loop body. The instructions for a given loop iteration enter the software-pipeline stage by stage, on successive initiation intervals (II), and new loop iterations begin on successive initiation intervals until all iterations of the loop have been started. Each loop iteration is thus processed in stages through the software-pipeline in much the same way that an instruction is processed in stages through a processor pipeline. When the software-pipeline is full, stages from SC sequential loop iterations are in process concurrently, and one loop iteration completes every initiation interval. Various methods for implementing software-pipelined loops are discussed, for example, in B. R. Rau, M. S. Schlansker, P. P. Tirumalai, *Code Geiteration Schema for Modulo Scheduled Loops* IEEE MICRO Conference 1992 (Portland, Oreg.) and in, B. R. Rau, M. Lee, P. P. Tirumalai, M. S. Schlansker, *Register Allocation for Software-pipelined Loops*, Proceedings of the SIGPLAN '92 Conference on Programming Language Design and Implementation, (San Francisco, 1992).

The initiation interval (II) represents the number of processor clock cycles ("cycles") between the start of successive iterations in a software-pipelined loop. The minimum II for a loop is the larger of a resource II (RSII) and a recurrence II (RCII) for the loop. The RSII is determined by the availability of execution units for the different instructions of the loop. For example, a loop that includes three integer instructions has a RSII of at least two cycles on a processor that provides only two integer execution units. The RCII reflects cross-iteration or loop-carried dependencies among the instructions of the loop and their execution latencies. If the three integer instructions of the above-example have one cycle latencies and depend on each other as follows, inst1→inst2→inst3→inst1, the RCII is at least three cycles.

RSII and RCII are illustrated for the following code segment, which includes instructions from the IA64™ instruction set architecture (ISA) of Intel® Corporation of Santa Clara, Calif.:

| blk6: | (1) |  | addi | V7 | =1, V7 |  |
|---|---|---|---|---|---|---|
|  | (2) |  | addi | V8 | =1, V8 |  |
|  | (3) |  | addi | V9 | =1, V9 |  |
|  | (4) |  | ld1 | V13 | =[V9] |  |

-continued

| (I) | (5) |  | cmp4.eq | p0, V19 | =V13, r0 | (CMP) |
|---|---|---|---|---|---|---|
|  | (6) | (V19) | ld1 | V14 | =[V7] |  |
|  | (7) | (V19) | sxt1 | V10 | =V14 |  |
|  | (8) | (V19) | sxt1 | V11 | =V13 |  |
|  | (9) | (V19) | cmp4.eq | V17, p0 | =V10, V11 | (CCMP) |
|  | (10) | (V17) | br |  | blk6 |  |

Here, (V19) and (V17) operate as predicates to gate the instructions that follow on and off.

Code segment (I) has an RSII of 3 cycles and an RCII of 5 cycles on an Itanium™ processor of Intel® Corporation. The RCII is determined by the chain of dependence edges (9)→(5)→(6)→(7)→(9), assuming a 2 cycle latency for instruction (6) (ld1) and a one cycle latency for the remaining instructions. The RSII is determined by the execution resources provided by the Itanium™ processor.

A software-pipelined loop has its maximum ILP when its RCII is less than or equal to its RSII. This is difficult to achieve for loops that include control flow operations within the loop body. Control flow operations are often implemented through predicates that are evaluated by compare instructions (CMPs), and available compilers do not allow these CMPs to be speculated. An instruction is speculated when it is executed before the processor determines that the instruction needs to be executed. In software-pipelined loops, instructions from multiple loop iterations execute in parallel, and instructions from later iterations may be executed unnecessarily if the loop terminates at an earlier iteration. Speculating a CMP within a software-pipelined loop entails significant overhead to ensure that any non-speculative operations gated by a speculated CMP are canceled if the iteration containing the speculated CMP is not reached.

In code segment (I), for example, instruction (5) (CMP) determines a predicate value, V19, which activates/deactivates instructions (6) through (9), and instruction (9) (CCMP) determines whether the loop repeats or terminates. A conventional compiler includes loop-carried dependence edge (9)→(5) in the data dependence graph (DDG) for code segment (I). The loop-carried edge ensures that when code segment (I) is modulo-scheduled, CMP for the $n^{th}$ loop iteration does not execute until CCMP for the $(n-1)^{st}$ iteration determines that the $n^{th}$ iteration is reached. This strategy simplifies bookkeeping for software-pipelined loops, but it may also lead to unnecessarily large RCIIs for the loops, which can reduce performance.

The present invention addresses these and other problems associated with software-pipelined loops.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

Embodiments of the present invention are illustrated using instructions from the IA64™ Instruction Set Architecture (ISA) of Intel Corporation, but these embodiments may be implemented in other ISAs that support predication and software pipelining. The IA64 ISA is described in detail in the Intel® IA64 Architecture Software Developer's Guide, Volumes 1–4, which is published by Intel® Corporation of Santa Clara, Calif.

Figure 1:
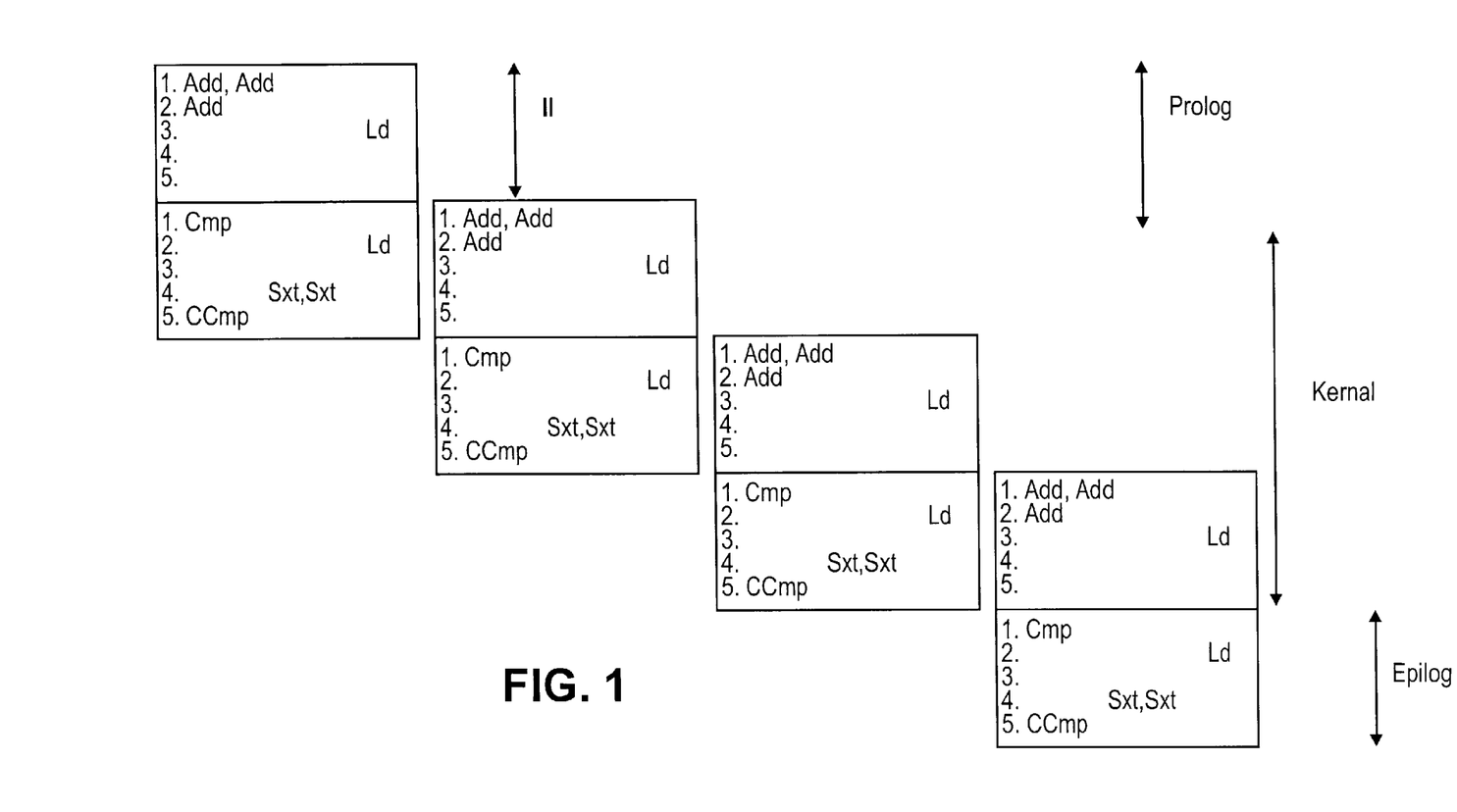
FIG. 1 represents a software-pipelined loop that has been scheduled using a conventional compiler.

FIG. 1 represents successive iterations of a modulo-scheduled loop generated from code sequence (I) using conventional methods. The modulo-scheduled loop includes two pipeline stages ("stages"), each of which is 5 cycles long, due to the dependency chain noted above. The relatively large II is attributable, in part, to the absence of compare speculation for instruction 5 (CMP) on successive loop iterations. Load instruction (4) is speculated. (Ld.s), because it is executed ahead of the CCMP that gates it, but the overhead for this speculation is the addition of a check instruction (Chk.s). The CMP itself is not speculated. Rather, the CMP for a given iteration is executed after the control compare instruction (9) (CCMP) for the prior iteration. This limits the scheduler's flexibility when modulo scheduling code segment (I). Also indicated in the figure is a prolog stage, in which the software pipeline fills, a kernel stage, in which both stages are active, and an epilog stage, in which the software pipeline drains.

The large II for the exemplary software-pipeline loop reduces the efficiency of the software-pipeline by limiting the overlap of instructions, i.e. ILP, from different loop iterations. In the example loop, instructions from only two iterations may be executed at the same time. The proscription against CMP speculation limits the flexibility of the compiler to find a more efficient modulo-schedule for code segment (I), and makes it difficult to achieve any further reduction of II.

Figure 2:
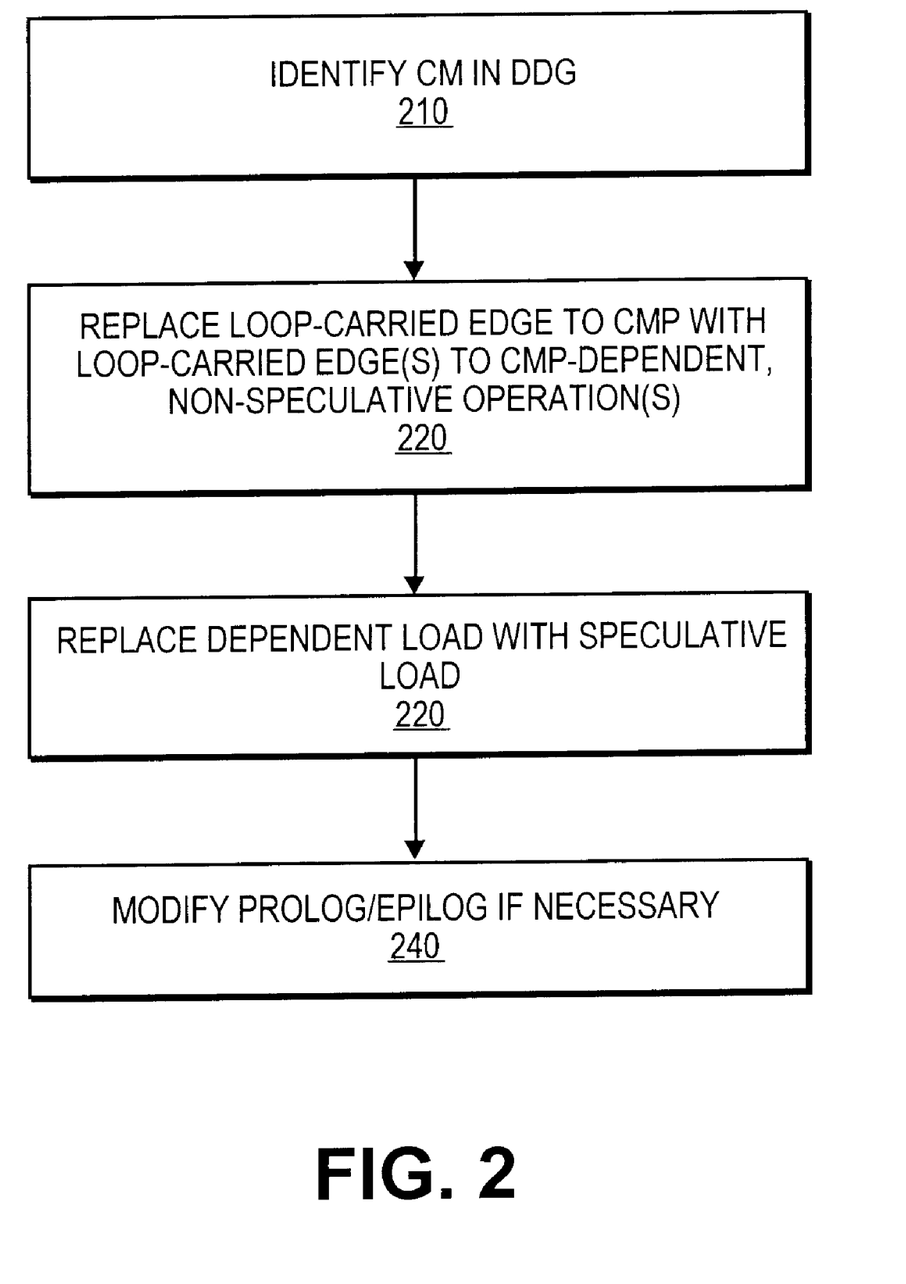
FIG. 2 represents a method in accordance with the present invention for speculating control flow operations in software pipelined loops.

FIG. 2 provides an overview of one embodiment of a method 200 in accordance with the present invention to support compare speculation in a software-pipelined loop. Method 200 assumes that a data dependence graph (DDG) has already been generated for the loop. A flow control operation, e.g. CMP, is identified 210 in the DDG. The loop-carried dependence edge between the loop control operation (CCMP) and CMP is replaced 220 with a loop-carried dependence edge between CCMP and any non-speculative operations that depend directly or indirectly on CMP. This replacement allows CMP to be speculated during modulo scheduling.

Non-speculative instructions are instructions that are not allowed to be executed speculatively. For the IA64 ISA, these include store instructions and check instructions (chk.s). A store instruction modifies the processor's architectural state, and it should only be implemented when it is determined that the instruction is actually executed in the program flow. A chk.s indicates whether a speculative operation raised any exceptions and cannot itself be speculated.

If the CMP is speculated, any load instructions that depend directly or indirectly on CMP are replaced 230 with speculative load instructions. A modulo-scheduler function of the compiler may determine whether it is efficient to speculate the CMP. In addition, the modulo-scheduled loop generated from the DDG may be further modified 240, if necessary, to address complications associated with the filling (prolog) and draining (epilog) of the software-pipeline. These complications are discussed in greater details below.

Figure 3:
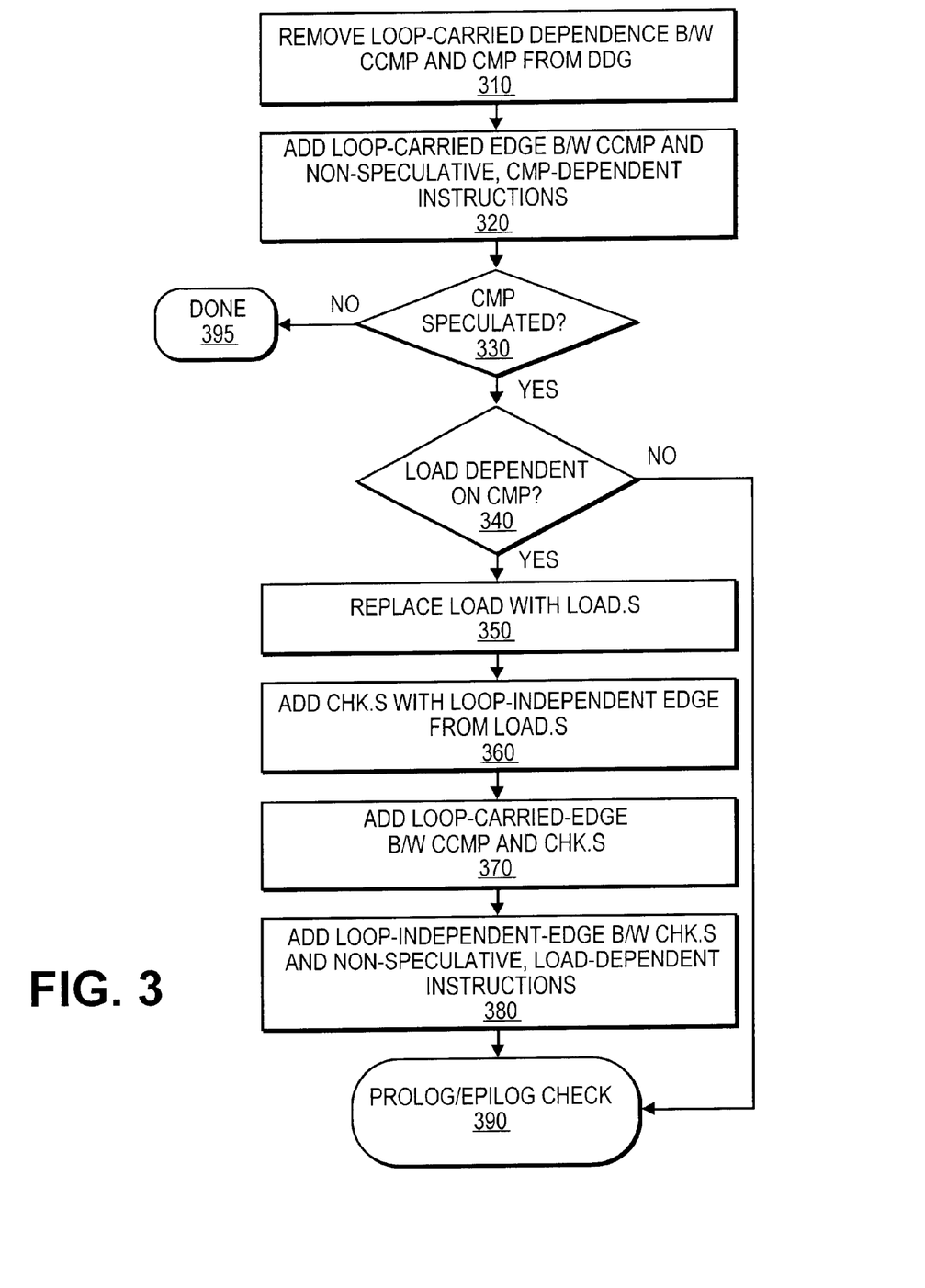
FIG. 3 is a flowchart representing in greater detail one embodiment of the method of FIG. 2.

FIG. 3 is a flowchart representing in greater detail one embodiment of a method 300 for implementing compare speculation in software-pipelined loops. Method 300 modifies a DDG for the loop to enable compare speculation while ensuring the integrity of the data processed by the loop.

For the disclosed embodiment of method 300, a loop-carried-edge between the control compare (CCMP) and a compare that may be control speculated (CMP) is removed 310 from the DDG. A loop-carried edge is added 320 between the CCMP and any non-speculative instruction(s) that depends on the CMP. With these changes to the DDG, the CMP may be executed speculatively, if the compiler determines that this is efficient.

For one embodiment, a modulo-scheduling function in the compiler operates on the DDG to determine 330 whether speculating the CMP reduces the RCII for a loop containing the CMP. If the CMP is not to be executed speculatively, method 300 is done 395. If the CMP is to be executed speculatively 330, the loop is examined to determine 340 whether it includes a load instruction that depends, directly or indirectly, on the CMP. If no such load instruction is identified 340, method 300 checks 390 the prolog/epilog of the modulo-scheduled loop. If the loop includes a load that depends on the CMP 340, it is replaced 350 with a speculative load instruction (ld.s). A chk.s is added 360 to the DDG along with a loop-independent edge from the ld.s to chk.s A loop-carried edge from the control compare to the-chk.s is added 370 to the DDG, and a loop-independent edge is added 380 to the DDG between the chk.s and any non-speculative instruction(s) that depends on the load instruction. The loop-independent edge ensures that the non-speculative instruction does not execute until the speculative load on which it depends has been checked for exceptions.

The loop may then be checked 390 to ensure that the prolog and epilog phases of the software-pipelined loop are implemented correctly. Different strategies for implementing these steps are discussed below in greater detail.

Figure 4A:
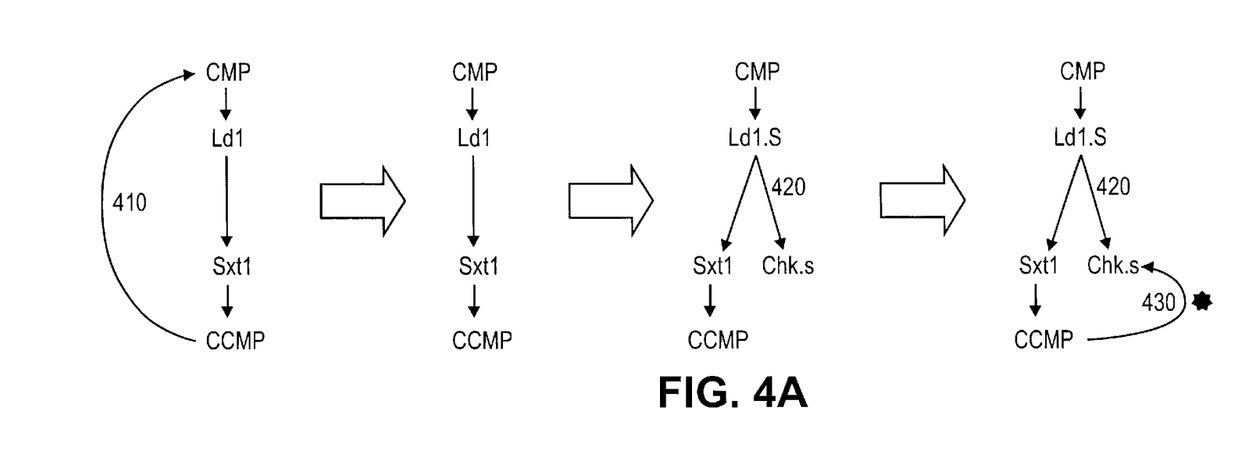
FIGS. 4A and 4B indicate the modification of two data dependency graphs in accordance with the present invention.

FIG. 4A illustrates the application of method 300 to a DDG 400 for code sequence (I) to reduce RCII for the loop. Initially, a loop-carried edge 410 from CCMP to CMP is identified and it is removed from DDG 400. Since code sequence (I) does not include any non-speculative instructions that depend on CMP, no loop-carried edges are added at this point. A load instruction (ld1) that depends on CMP is replaced by a speculative load (ld1.s), and a chk.s is inserted in DDG 400 with a loop-independent edge 420 from ld1.s to chk.s. Edge 420 is assigned a latency that corresponds to the latency of ld1.s.

A loop-carried edge 430 is added from CCMP to chk.s to ensure that chk.s for an $n^{th}$ iteration is executed only if the $n^{th}$ iteration of the loop is reached. For one embodiment of the invention, loop-carried edge 430 is annotated (star) to indicate that chk.s is scheduled in a stage that only executes after the stage that includes CCMP for the previous iteration. This may be accomplished, for example, by scheduling chk.s and CCMP in the same stage, since sequential iterations of the loop are offset by II.

Figure 4B:
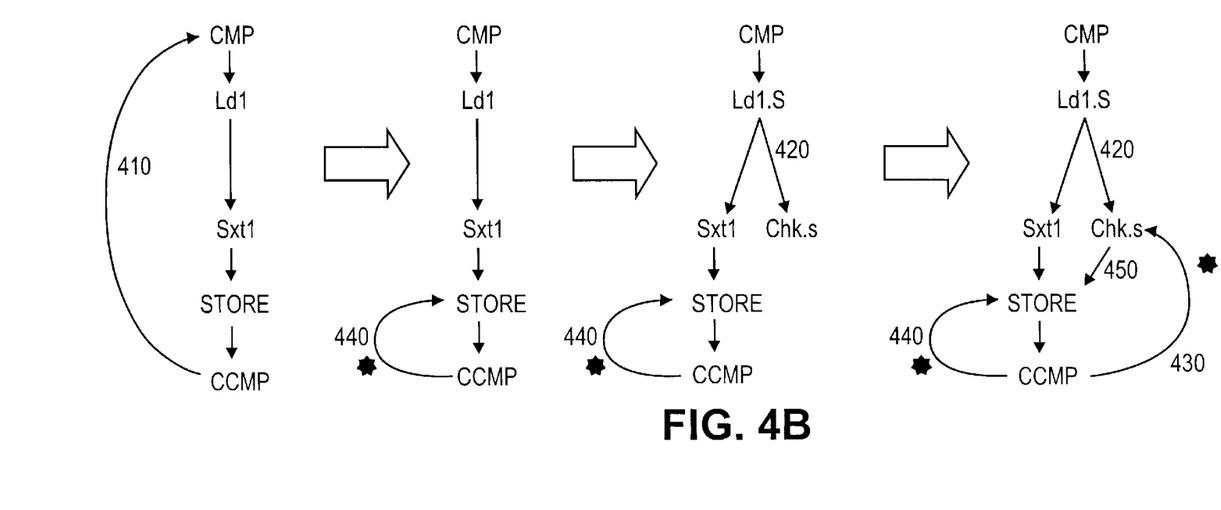

If code segment (I) included a non-speculative instruction that depended on the speculative load, a loop independent edge having the latency of chk.s would be added between chk.s and the non-speculative instruction. FIG. 4B illustrates this situation with a loop derived from code sequence (I). In particular, a store (st4) that depends on load instruction (6) and, indirectly, on CMP, has been added to the loop to illustrate certain operations of the present invention.

The operations for the modified loop parallel those shown in FIG. 4A with the following changes. A loop-carried edge 440 is added from CCMP to the CMP-dependent store to ensure that the (non-speculative) store for a particular iteration is not executed unless the iteration is reached. Also, since the store depends on the speculative load, a loop-independent edge 450 having the latency of chk.s is added between chk.s and the store. For processors that implement the IA64 ISA, chk.s has a zero latency. The store is a non-speculative instruction that depends, indirectly, on ld1. Edge 450 ensures that the store is not executed until any deferred exceptions associated with ld1.s are serviced. For the disclosed example, loop-carried edge 440 is redundant in view of loop-carried edge 430 and loop-independent edge 450. Embodiments of the present invention may be modified to eliminate redundant edges if they arise.

Figure 5:
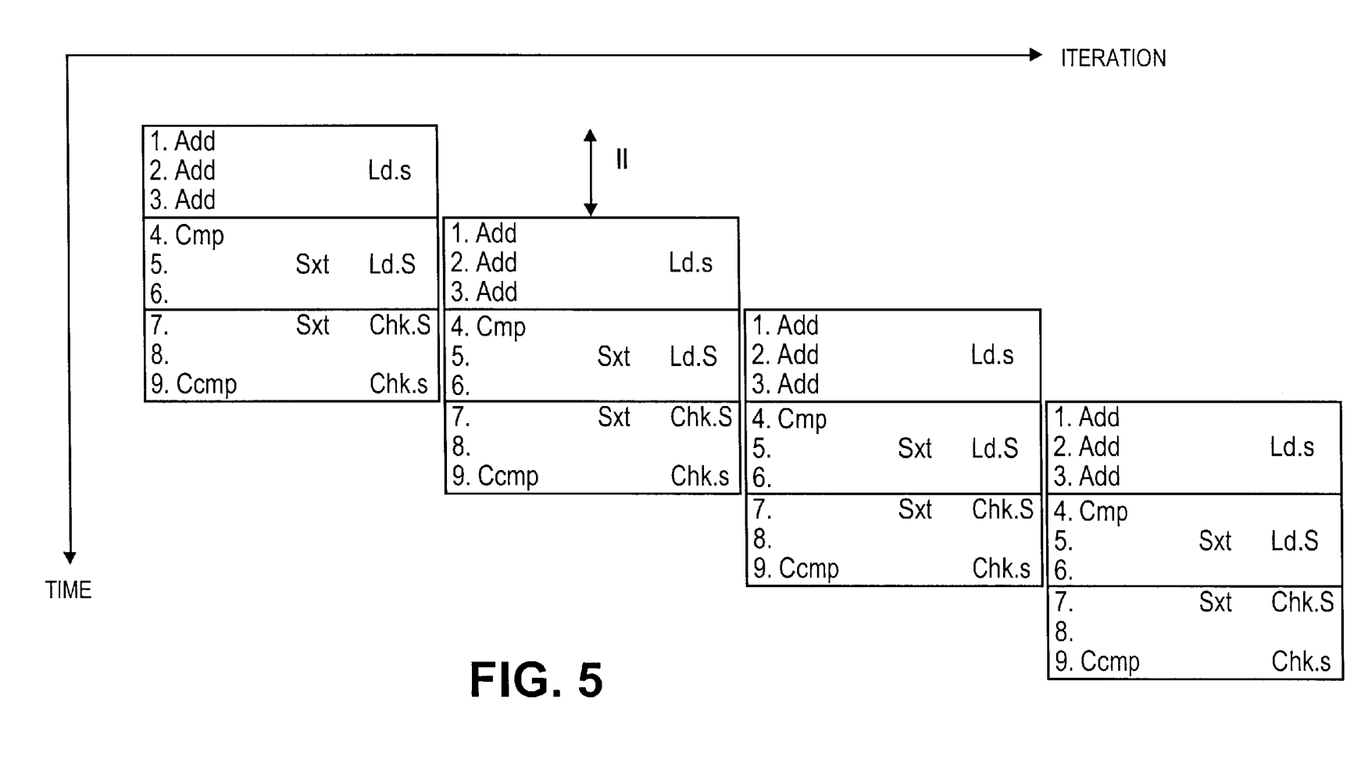
FIG. 5 represents a software-pipelined loop for the code segment of FIG. 1 that incorporates compare speculation.

FIG. 5 represents the software-pipeline generated for the same loop shown in FIG. 1 after it has been processed in accordance with the present invention. Eliminating the loop-carried dependence edge between CCMP and CMP has allowed CMP to be control speculated. For example, CMP for the $n^{th}$ iteration executes before CCMP for the $(n-1)^{st}$ iteration. The load that depends on CMP has been converted to a speculative load, to reflect the compare speculation, and a check (chk.s) has been added to the instruction flow. The load that precedes the CMP has also been converted to a speculative load, but this conversion occurs independent of Compare Speculation. A loop-carried dependence is introduced between the CCMP and the chk.s to ensure that the chk.s for the $n^{th}$ iteration executes only if the CCMP of the $(n-1)^{st}$ iteration indicates the $n^{th}$ iteration is reached.

Scheduling of other non-speculative instructions may be managed through the addition of various edges. For example, if the loop includes a store instruction that depends on the speculated load, a loop-independent edge from CHK.S to the store ensures that the processor's architectural state is not updated unless the exception that is possibly raised by ld.s has been serviced. If the store depends only on the CMP, a loop-carried edge from the CCMP to the store ensures that the architectural state is updated only when the iteration containing the store is executed.

A benefit of the present invention is indicated by the shorter II for the software-pipelined loop of FIG. 5. The greater scheduling flexibility afforded by control speculating CMP allows the execution resources of the processor to be used more efficiently. Since the modified loop has an RCII of 1 cycle, the loop's II is determined by the larger RSII of 3 cycles. This represents a 40% reduction in II over the unmodified loop in which the 5 cycle RCII determines II.

Speculating control-flow compares (CMP) in a software-pipelined loop requires that the instructions gated by the speculated compares (or more accurately, instructions gated by the predicates determined by the speculated compares) are properly handled. The present invention accomplishes this by replacing the loop-carried edges between the CCMP and CMP with loop-carried edges between the CCMP and selected instructions guarded by the CMP. This works well as long as the CCMP is in the last stage of the software-pipelined loop, because the loop termination process, i.e. the epilog, begins as soon as the instructions in this stage complete.

For certain loops, the CCMP is not in the last stage of the software-pipelined loop. For these loops, one or more stages of the terminal iteration execute in the epilog phase. Loop-carried edges referenced to the CCMP do not guarantee that non-speculative instructions from later iterations of the loop do not execute while the last stage(s) of the terminal iteration completes. One embodiment of the present invention employs explicit epilogs to address this problem.

Figure 6:
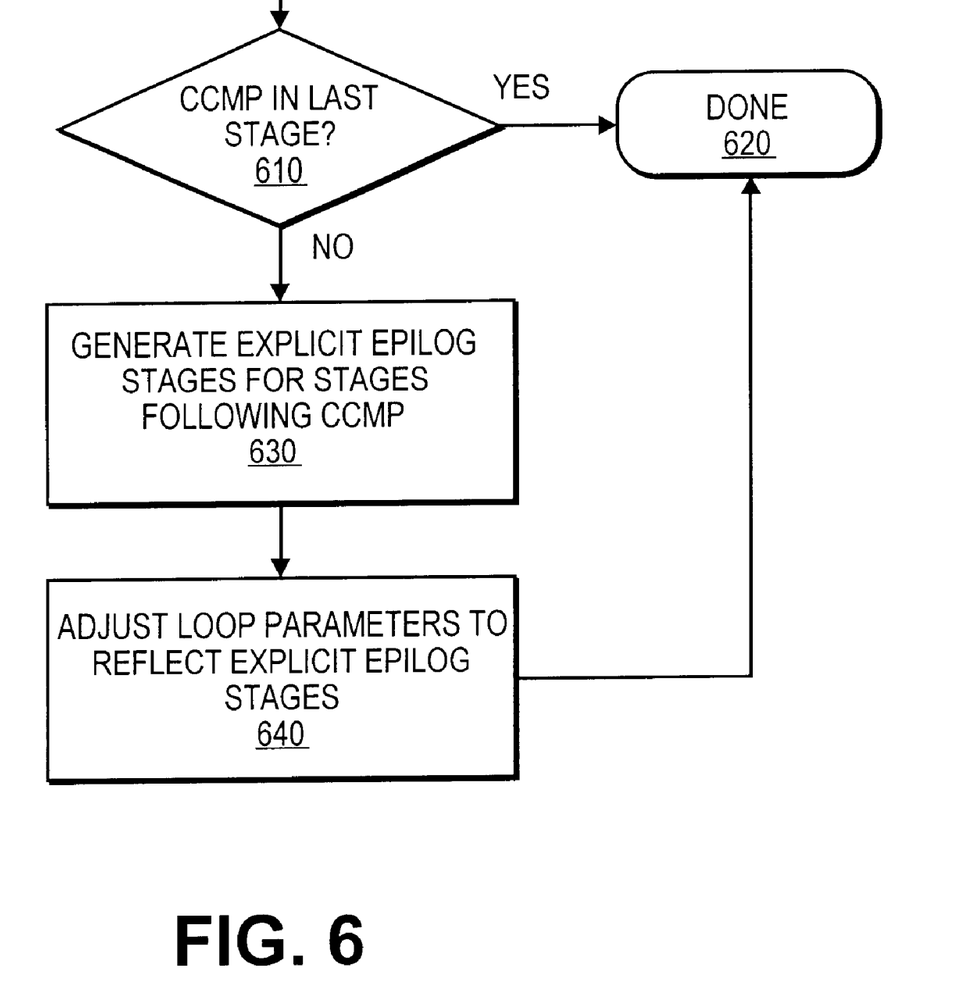
FIG. 6 is a flow chart representing one embodiment of method for modifying an epilog portion of a software-pipelined loop in accordance with the present invention.

FIG. 6 is a flowchart representing one embodiment of a method 600 in accordance with the present invention for handling epilogs in selected modulo-scheduled loops. Method 600 may be implemented in block 240 of method 200, for example, after the loop has been modulo-scheduled. For the disclosed method, the modulo-scheduled loop is examined to determine 610 if the control compare (CCMP) occurs in the last stage of the modulo-scheduled loop. If it does, method 600 is done 620. If it does not, an explicit epilog stage is added 630 for each additional stage after the stage that includes the CCMP, and the loop control parameters are updated 640 to reflect the use of explicit epilog stages.

An explicit epilog expands the size of a code segment because instructions of the epilog are duplicated. For example, the instructions appear in both the loop body and in the explicit epilog. The resulting code expansion can be significant, particularly if the loop body includes a large number of instructions and multiple epilog stages need to be explicitly coded.

Predicate arithmetic provides an alternative to the use of explicit epilogs. This approach is illustrated with reference to code segment (II).

```
        Loop:
            (1)              cmp.ne    pX = V1, V2   (CMP)
            (2)              . . .
   (II)     (3)     (pX)     st4       [V3] = V4
            (4)     (pX)     ld        V5 = [V6]
            (5)              . . .
```

|     |      |        |              |        |
| --- | ---- | ------ | ------------ | ------ |
| (6) | (pX) | cmp.le | pY = V7, V8  | (CCMP) |
| (7) | (pY) | br     | Loop         |        |

Instruction (3) is a store instruction, which is non-speculative. Instruction (1), CMP, determines the predicate, pX, which gates st4 on or off. Control speculating the CMP means that it is executed for a given iteration before it has been determined that the loop reaches the iteration. Because st4 is non-speculative, it should be executed for the given iteration only when (pX) is true and the iteration is known to be executed. The latter condition is indicated when the loop predicate, pY, that is computed in the previous iteration is true. The concurrence of these conditions may be represented by a predicate, pZ, defined through the following predicate arithmetic:

$$pZ = pX \text{ AND } pY$$

For one embodiment of the invention, predicate arithmetic may be used to ensure proper scheduling of non-speculative instructions that are gated by a speculated CMP in a software-pipelined loop. Code segment (III) represents code segment (II) following modification in accordance with another embodiment of the present invention.

|       | Loop: |      |            |                |        |
| ----- | ----- | ---- | ---------- | -------------- | ------ |
|       | (1)   |      | cmp.ne     | pX = V1, V2    | (CMP)  |
| (III) | (2)   |      | . . .      |                |        |
|       | (3)   | (pX) | ld.s       | V5 = [V6]      |        |
|       | (4)   |      | . . .      |                |        |
|       | (5)   |      | mov        | r11 = pr       |        |
|       | (6)   | (pY) | tbit.nz.unc | pZ = r11, X   |        |
|       | (7)   | (pZ) | st4        | [V3] = V4      |        |
|       | (8)   | (pZ) | chk.s      | V5, recovery_code |    |
|       | (9)   | (pZ) | cmp.le     | pY = V7, V8    | (CCMP) |
|       | (10)  | (pY) | br         | Loop           |        |

For code segment (III), pr represents a collection of predicate registers that store corresponding predicate values. Instruction (5) copies these predicate values to register r11. Instruction (6) is a test bit instruction that sets the value of predicate pZ to the same value as the $X^{th}$ bit of r11, i.e. the value of pX. Instruction (6) is gated by pY, the loop predicate determined by CCMP of the previous iteration. Consequently, instruction (6) is activated when CCMP determines that the next loop iteration is reached, and pZ is true only when the next iteration is reached and the predicate set by instruction (1), the speculated CMP, is true. This approach ensures that the store instruction (7), executes for a given iteration only if the (speculated) CMP is true and the given iteration is reached.

An alternative to code segment (III) employs the following code sequence in place of instructions (5) and (6):

|      |      | r11        | =1          |
| ---- | ---- | ---------- | ----------- |
| (IV) | (pX) | r11        | =r0         |
|      | (pY) | cmp.eq.unc | pZ = r11, r0 |

Here, r0 is hard-wired to zero. Code segment (IV) achieves the same operations as instructions (5) and (6) in code segment (III), but does so using an additional instruction. One issue with the predicate arithmetic approach is that the additional instructions may increase RSII. The 2 instruction version is therefore preferable for those ISAs that support a test bit instruction.

Figure 10:
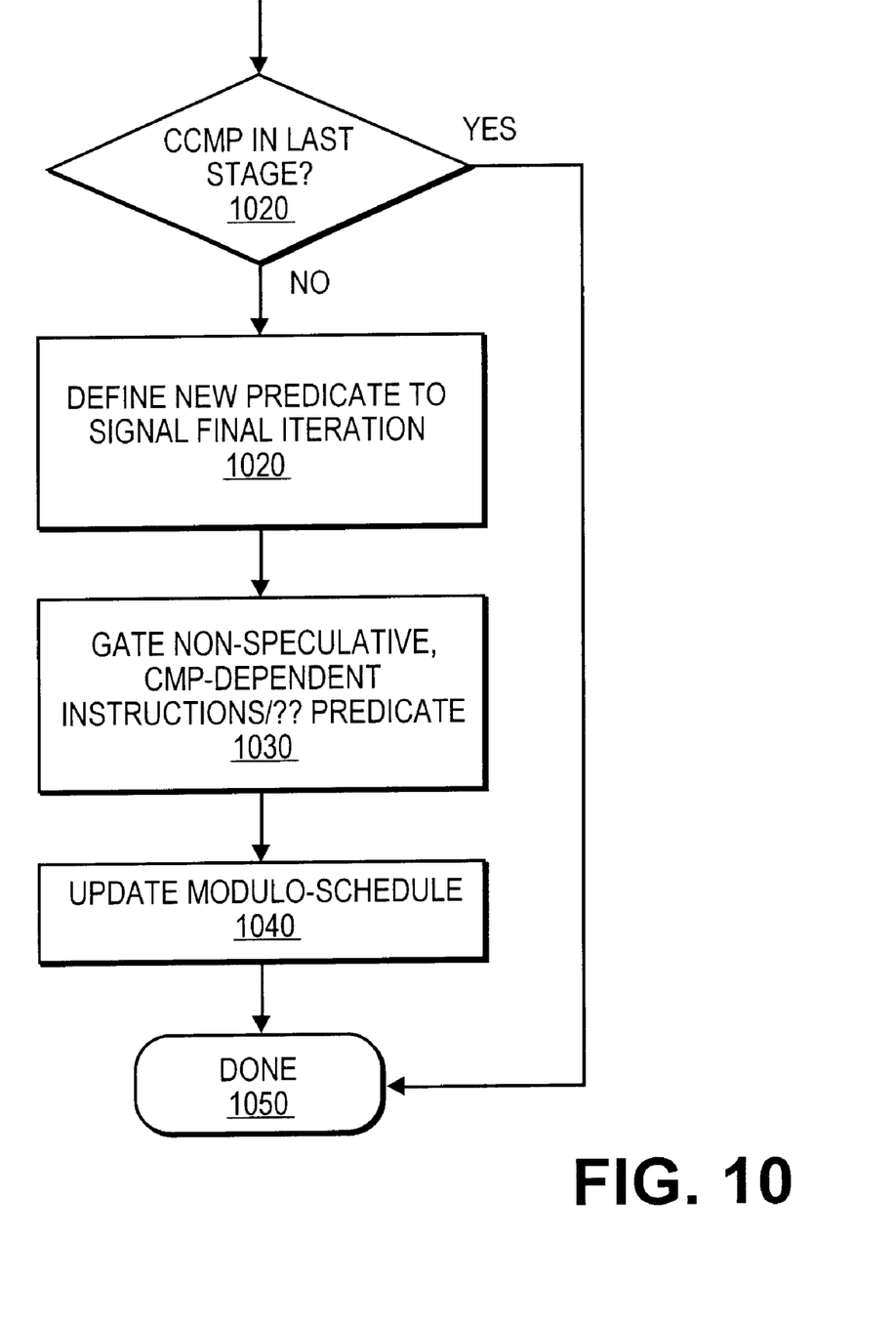
FIG. 10 is flowchart representing one embodiment of a method for modifying a modulo-scheduled loop if the control compare instruction is not in the last stage of the software pipeline.

FIG. 10 is a flowchart representing one embodiment of a method 1000 for handling non-speculative instructions for compare speculation if the control compare is not in the final stage of the modulo-scheduled loop. This method implements compare speculation in a modulo-scheduled loop, using predicate arithmetic. Following modulo scheduling, it is determined 1010 whether CCMP is in the last stage of the software pipelined loop. If it is, method 1010 is done 1050. If CCMP is not in the final stage 1010, a new predicate is defined 1020. The new predicate is defined to be true only when the speculated CMP is true and the current iteration is to be executed. Non-speculative, CMP-dependent instructions are then gated 1030 by the new predicate. The modulo-schedule may then be updated 1040 to accommodate any additional instructions used in the predication process.

For method 300, edges between CCMP and non-speculative instructions may have to be tagged to indicate how they are scheduled relative to CCMP. For example, these non-speculative CMP-dependent instructions may be tagged to indicate that they should be scheduled to execute in a stage that follows the CCMP for the prior iteration. For method 1010, this tagging may be replaced by appropriate dependence edges between CCMP and the predicate arithmetic instructions.

Another complication associated with speculating compares arises when the speculated compare over-writes or "clobbers" a live-in value provided to the loop. This may happen, for example, in the prolog stage of the software-pipelined loop, before the kernel is established. The potential problem is illustrated by the following code sequence:

|     |       |       |            |             |         |        |
| --- | ----- | ----- | ---------- | ----------- | ------- | ------ |
|     | (1)   |       | mov        | pr.rot      | =0x10000 |        |
|     | (2)   |       | mov        | EC          | =2      |        |
|     | Loop: |       |            |             |         |        |
|     | (3)   |       | . . .      |             | stage A |        |
| (V) | (4)   |       | cmp.ne     | p20         | =r39, r0 | stage B |
|     | (5)   | (p21) | cmp.le     | p17         | =r35, r11 | stage C | (CCMP) |
|     |       |       | . . .      |             |         |        |
|     | (6)   | (p17) | br.wtop    | Loop.       |         |        |

Instructions (1) and (2) initialize the predicate registers and the epilog counter, respectively, for the software-pipelined loop. The predicate registers may be used to activate/deactivate instructions for the different stages of the software-pipeline. The epilog counter indicates the number of stages that are activated during the prolog and/or epilog portions of the software-pipelined loop. Instructions (3), (4), and (5) form the body of a "while" loop. Software pipelining the loop in accordance with one embodiment of the present invention schedules instruction(s) (3), instruction (4), and instruction (5) in stages A, B, and C, respectively, of the loop. The qualifying predicate, p17, and EC determine whether the "while" loop continues or terminates.

Embodiments of the present invention described so far ensure that instructions are executed properly during the transition from the kernel phase to the epilog phase. For example, instruction (5) controls the loop behavior through the loop predicate, p17, provided its qualifying predicate, p21, is true for the current iteration. The value of p21 for the current iteration is provided by the value of p20 from the previous iteration through register rotation. Instruction (4) determines p20 according to the values of r39 and r0. However, the prolog portion of the illustrated loop may cause the loop to terminate prematurely under certain conditions. These conditions may be better appreciated with reference to loop operations for modulo-scheduled "while" loops.

Figure 7:
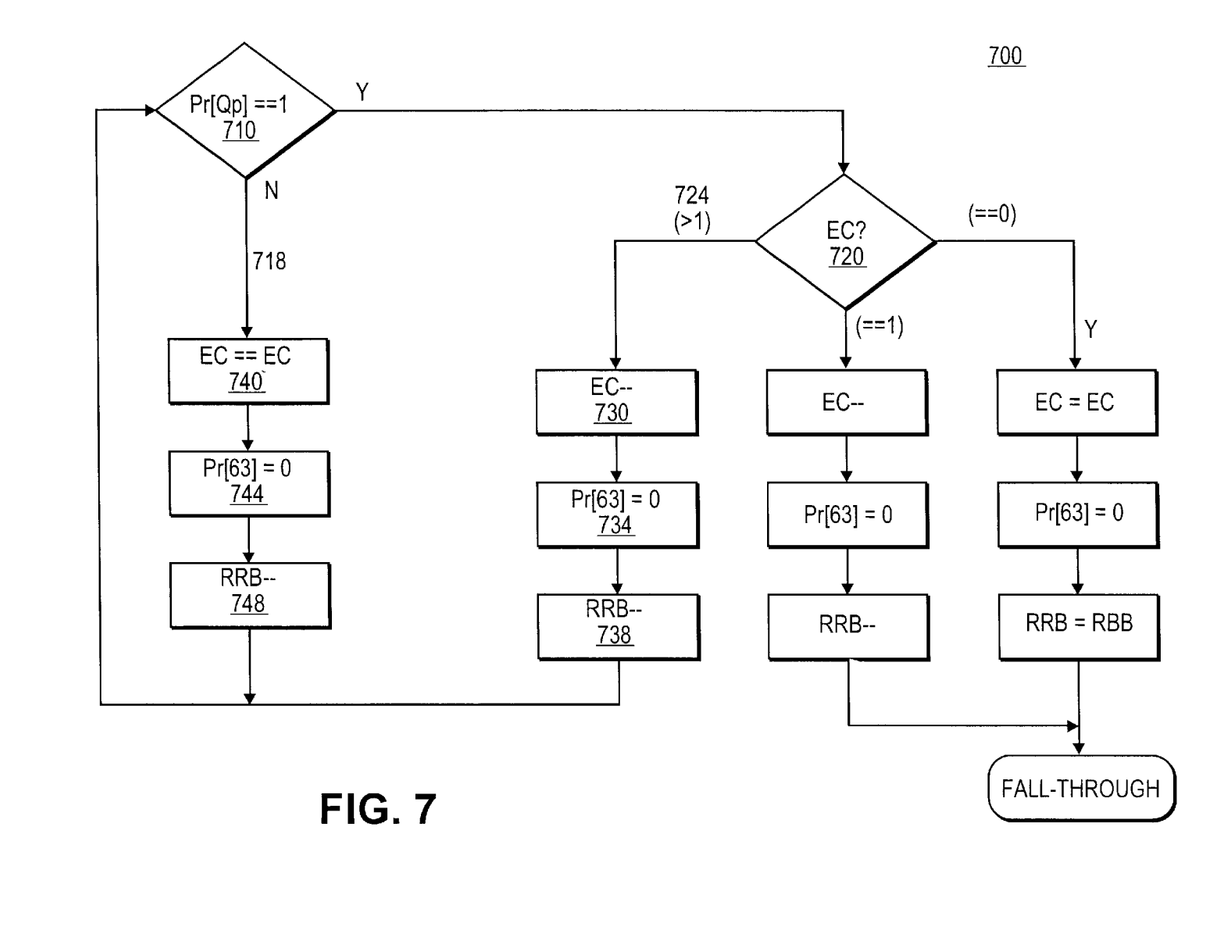
FIG. 7 is a flow chart representing a modulo-scheduled "while" loop branch instruction suitable for use with the present invention.

FIG. 7 is a flowchart representing the operation of one embodiment of a "while" type loop according to the IA64 ISA. At block 710 the value of the qualifying predicate (PR[qp]) is determined. The "while" loop continues if PR[qp] is true or if both PR[qp] is false and EC is greater than one 720. During the first cycle of the exemplary loop, p17=0 and EC=2 due to instructions (1) and (2) respectively. The "while" loop follows path 724, decrementing EC 730, setting a stage predicate (p63) to zero 734, and rotating the registers (RRB . . . ) 738. For the IA64 ISA, the rotating predicate registers are p16 through p63. Register rotation 738 shifts the contents of p63 to p16, p16 to p17, et seq.

During the second cycle of the exemplary loop, p17 is 1 due to rotation of the register value from p16, and the "while" loop follows path 718, preserving the value of EC 740, setting stage predicate p63 to zero 744 and rotating the registers 748. During the third cycle of the exemplary loop, p17 is defined by instruction (5), provided p21 is true. However, because instruction 4 is speculated, it is executed in the first cycle (and the second cycle), and the value of p20 determined in the first cycle is rotated into p21 in the second cycle. This activates instruction (5) one cycle early, and the values of its operands r35 and r11 are not reliable. For example, if these values set p17 to zero, the loop will terminate, (via path 728) because the value of p17 provided by rotating register p16 is clobbered by the premature activation of instruction 5.

For one embodiment of the present invention, this problem is eliminated by using an explicitly-coded prolog. That is, some or all of the instructions executed during the prolog phase of the modulo-schedule loop are scheduled before the loop begins, and the loop is initiated at a later stage of the prolog phase. For the above example, the initialization conditions are adjusted to begin the loop at the second iteration (EC=1, pr.rot=0x20000) and instructions belonging to stage A (e.g. instruction (3)) are executed prior to the loop. This explicit prolog does not include instruction (4), to avoid the above-noted problem.

Figure 8:
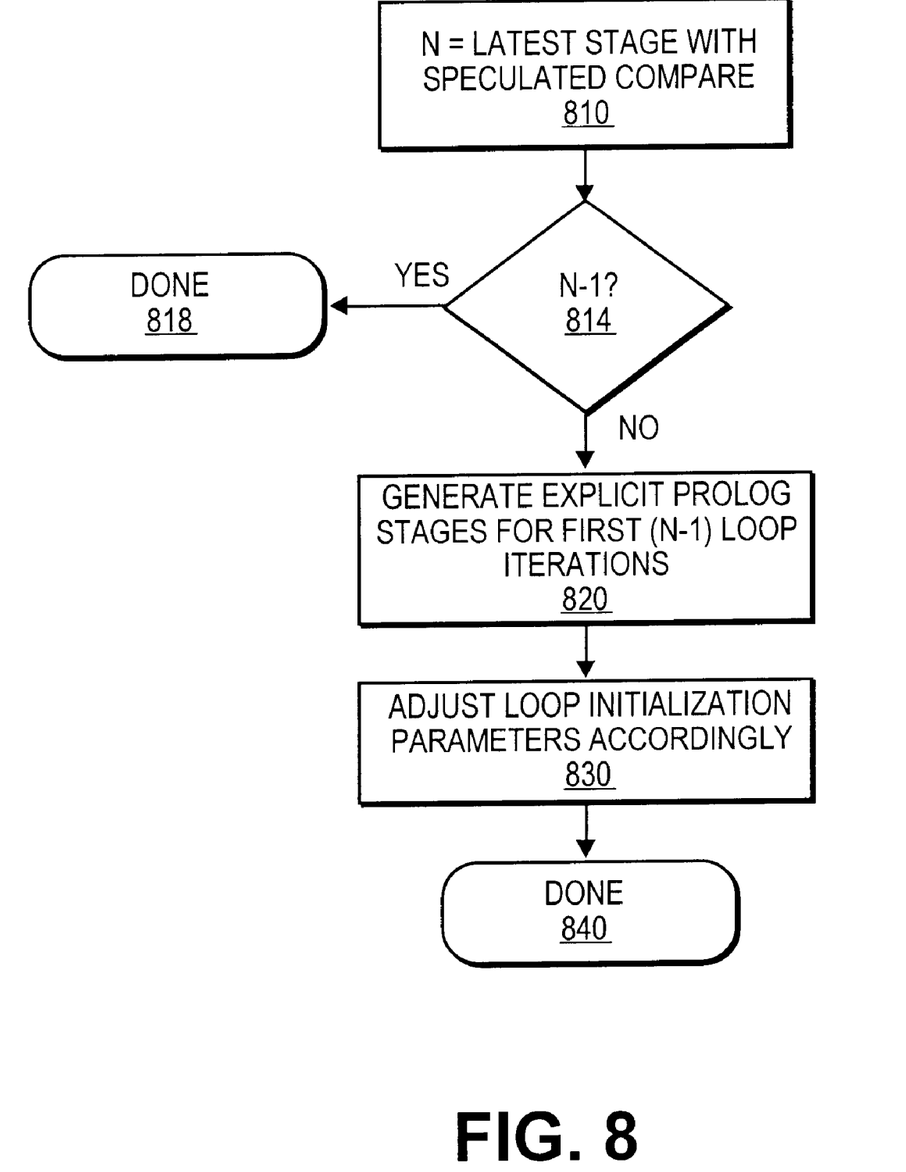
FIG. 8 represents one embodiment of a method for modifying a prolog portion of a software-pipelined loop in accordance with the present invention.

FIG. 8 is a flowchart representing one embodiment of a method 800 that ensures proper handling of the prolog stages for loops that implement compare speculation. The latest stage (N) in the software-pipeline that contains a speculated compare is determined 810. If N is one 814, method 800 is done 818. If N is greater than one, method 800 continues. Instructions corresponding to the first (N−1) pipeline stages of the loop are scheduled before the loop 820, eliminating any instructions (or iterations of instructions) that clobber live-in values. The loop initialization parameters are adjusted 830 to reflect the fact that some stages of the prolog are executed outside of the loop, and the method is done 840.

Figure 9:
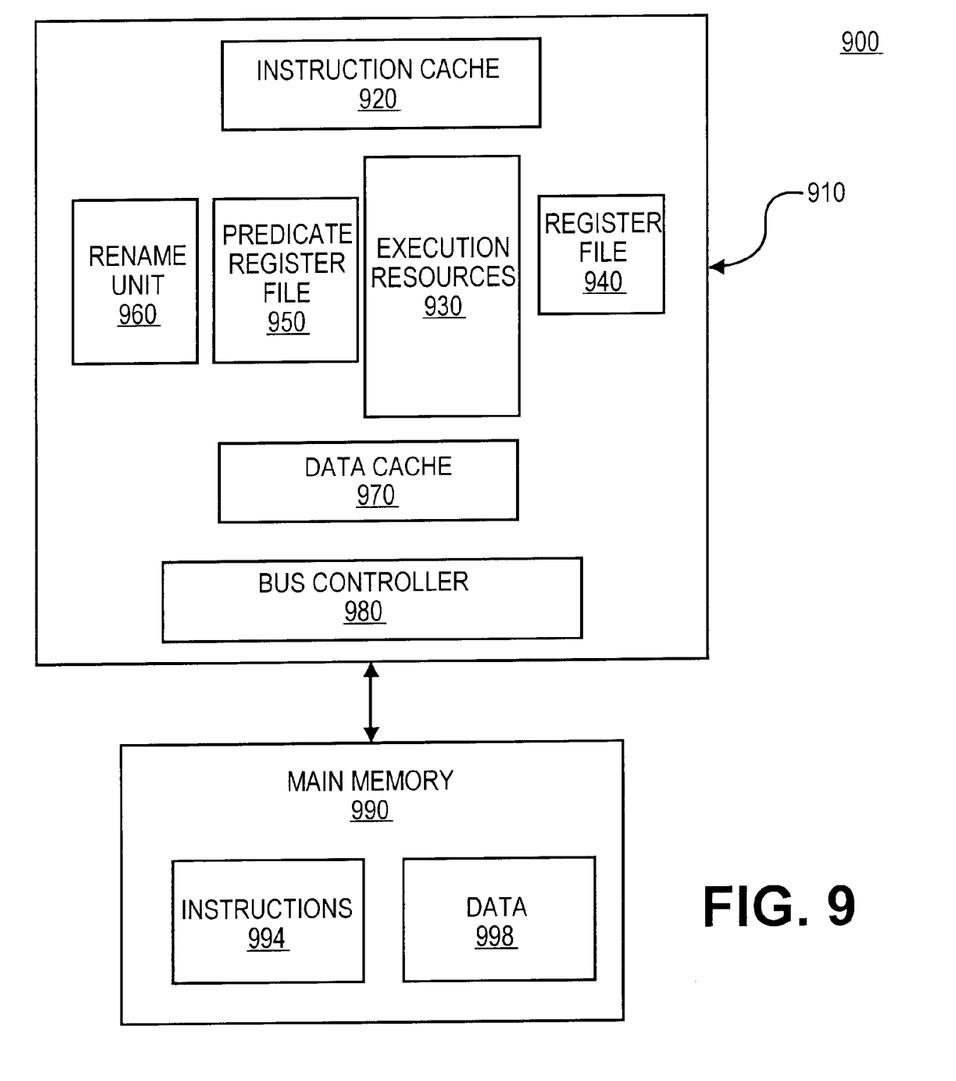
FIG. 9 represents an embodiment of a computer system that is suitable for software-pipelining loops in accordance with the present invention and executing programs that include such loops.

FIG. 9 is a block diagram of one embodiment of a computer system 900 that is suitable for software pipelining loops in accordance with the present invention. Computer system 900 may also execute programs that contain such software pipelined loops. The disclosed embodiment of computer system 900 includes a processor 910 and a memory system 990. Processor 910 includes an instruction cache 920, execution resources 930, a data register file 940, a predicate register file 950, a rename unit 960, a data cache 970 and a bus controller 980. Processor 910 may include other functional units, such as a cache controller, exception unit, and the like, which are not shown in FIG. 9.

Predicate register file 950 stores predicate values, which may be used to activate or deactivate various instructions. One embodiment of predicate register file 950 includes a non-rotating segment (p0–p15) and a rotating segment (p16–63). Predicate registers in the rotating segment may be rotated under control of rename unit to implement software pipelined loops.

Memory system 990 may store instructions 994 and data 998 for controlling the operation of processor 910. For example, instructions 994 may represent a compiler program that is applied to a target program by processor 910 to modify loops in the target program to implement compare speculation. Instructions 994 may also store a program modified in accordance with the present invention to support compare speculation. When run on processor 994, the program executes the modified loops, including those segments that speculate compares within the loop body and those segments that adjust bookkeeping to ensure instructions are properly executed.

The disclosed embodiments of the present invention are provided for purposes of illustration. Persons skilled in the art of programming and having the benefit of this disclosure will recognize variations on the disclosed embodiments that fall within the spirit of the present invention. The scope of the present invention should be limited only by the appended claims.

What is claimed is:

1. A method for generating a data dependence graph for a software-pipelined loop, the method comprising:

removing a loop-carried edge from a control compare operation in a first loop iteration to a compare operation in a next loop iteration; and converting a load operation that depends on the compare to a speculative load operation.

2. The method of claim 1, wherein converting a load operation comprises:

converting a load operation to a speculative load operation; and adding a check operation.

3. The method of claim 2, further comprising:

adding a loop-independent edge from the speculative load operation to the check operation; and adding a loop-carried edge from the control compare operation in the loop iteration to the check operation in the next loop iteration.

4. The method of claim 2, further comprising:

identifying a non-speculative operation that depends on the compare operation; and adding a loop-carried edge from the control compare operation to the non-speculative operation.

5. The method of claim 4, further comprising designating the non-speculative operation to execute in a stage of the software-pipeline that follows a stage in which the control compare operation of a prior loop iteration executes.

6. The method of claim 1, further comprising:

modulo-scheduling the loop, using the data dependence graph;

determining whether the control compare operation is in a last stage of the modulo-scheduled loop; and if the control compare operation is not in the last stage, modifying the modulo-scheduled loop to eliminate execution of a non-speculative instruction in loop iteration that is not reached.

7. The method of claim 6, wherein modifying the modulo-scheduled loop comprises generating an explicit epilog for the modulo-scheduled loop.

8. The method of claim 6, wherein modifying the modulo-scheduled loop comprises predicating the non-speculative instruction to execute only if the loop iteration in which it is scheduled is reached.

9. A method for modulo-scheduling instructions of a loop comprising:

identifying in a loop a control compare instruction, a compare instruction and a non-speculative instruction that depends on the compare operation;

replacing a loop-carried edge between the control compare instruction and the compare instruction with a loop-carried edge between the control compare and the non-speculative instruction; and modulo-scheduling the loop according to the replaced loop-carried edge.

10. The method of claim 9 further comprising:

determining whether the compare instruction is speculated following modulo-scheduling; and if the compare instruction is speculated, replacing a load instruction that depends on the compare instruction with a speculated load instruction.

11. The method of claim 10, further comprising:

adding a loop-carried edge between the control compare instruction and a check instruction associated with the speculated load instruction;

adding a loop-independent edge between the check instruction and the non-speculative instruction if the non-speculative instruction depends on the load instruction; and repeating modulo-scheduling using the added edge(s).

12. A method for executing a software-pipelined loop comprising:

executing a control flow instruction for an $n^{th}$ iteration of the loop before executing a control compare for an $(n-1)^{st}$ iteration of the loop;

executing a non-speculative instruction for the $n^{th}$ iteration of the loop no earlier than the control compare instruction for the $(n-1)^{st}$ iteration of the loop if the non-speculative instruction depends on the control flow instruction.

13. The method of claim 12, wherein executing the non-speculative instruction comprises executing a check instruction for the $n^{th}$ iteration of the loop, the check instruction being associated with a speculative load instruction that depends on the control flow instruction for the $n^{th}$ iteration of the loop.

14. The method of claim 13, wherein executing the control flow instruction comprises executing a compare instruction that determines a predicate value for the $n^{th}$ iteration.

15. The method of claim 14, further comprising executing a non-speculative instruction that depends on the speculative load no earlier than the check.

16. A machine readable medium on which are stored instructions that may be executed by a processor to implement a method comprising:

executing a compare instruction for an $n^{th}$ iteration of the loop before executing a control compare instruction for the $(n-1)^{st}$ iteration of the loop;

executing a non-speculative instruction for the $n^{th}$ iteration of the loop no earlier than the control compare instruction of the $(n-1)^{st}$ iteration if the non-speculative instruction depends on the compare instruction.

17. The machine-readable medium of claim 16, wherein the loop includes a load instruction that depends on the compare instruction and executing the non-speculative instruction further comprises:

executing the load instruction speculatively for the $n^{th}$ iteration; and executing a check instruction associated with the speculatively executed load instruction no earlier than the control compare instruction for the $(n-1)^{st}$ iteration of the loop.

18. The machine-readable medium of claim 17 wherein the method further comprises executing a non-speculative instruction for the $n^{th}$ iteration of the loop no earlier than the check instruction if the non-speculative instruction depends on the load instruction.

19. A computer system comprising:

a processor to execute instructions; and a memory to store instructions which may be executed by the processor to implement a method comprising:

executing a control flow instruction for an $n^{th}$ iteration of the loop before executing a control compare of the $(n-1)^{st}$ iteration of the loop;

executing a load that depends on the control flow instruction of the $n^{th}$ iteration as a speculative load; and executing a check for the speculative load after the control compare of the $(n-1)^{st}$ iteration.

20. The computer system of claim 19, wherein the loop includes a load instruction that depends on the compare instruction and executing the non-speculative instruction further comprises:

executing the load instruction speculatively for the $n^{th}$ iteration; and executing a check instruction associated with the speculatively executed load instruction no earlier than the control compare instruction for the $(n-1)^{st}$ iteration of the loop.

21. The computer system of claim 20 wherein the method further comprises executing a non-speculative instruction for the $n^{th}$ iteration of the loop no earlier than the check instruction if the non-speculative instruction depends on the load instruction.

* * * * *